United States Patent [19]

Ko et al.

[11] Patent Number: 5,245,770

[45] Date of Patent: Sep. 21, 1993

[54] DIPPER STICK FOR EXCAVATOR OF HIGH STRENGTH POLYMERIC COMPOSITE MATERIALS AND METHOD FOR MANUFACTURING SUCH

[75] Inventors: Jae I. Ko; Jae W. Lee; Yoon M. Lee; En J. Jean; Chun K. Kim; Jin Kim, all of Changwon, Rep. of Korea

[73] Assignee: Samsung Heavy Industries, Co., Ltd., Kyungsangnam, Rep. of Korea

[21] Appl. No.: 728,100

[22] Filed: Jul. 10, 1991

[30] Foreign Application Priority Data

Jul. 13, 1990 [KR] Rep. of Korea .................. 90-10658
Jun. 22, 1991 [KR] Rep. of Korea .................. 91-10418

[51] Int. Cl.[5] .............................................. E02F 5/02
[52] U.S. Cl. .................................... 37/443; 264/46.6; 264/46.5; 52/309.9; 414/694
[58] Field of Search .............. 37/103, 118 R, 80 R; 52/309.9, 309.8, 727, 724; 424/722, 694; 212/266; 264/46.6, 46.5, 46.8

[56] References Cited

U.S. PATENT DOCUMENTS

| | | | |
|---|---|---|---|
| 2,870,793 | 1/1959 | Bailey | 52/727 |
| 3,331,177 | 7/1967 | Godfrey | 52/727 |
| 3,977,548 | 8/1976 | McCannon et al. | 414/694 |
| 4,069,637 | 1/1978 | Braithwaite | 52/726 |
| 4,268,571 | 5/1981 | McCarthy | 264/46.6 |
| 4,340,226 | 7/1982 | Haines | 264/46.6 |
| 4,392,314 | 7/1983 | Albrecht et al. | 37/103 |
| 4,607,466 | 7/1986 | Larson | 264/46.5 |
| 4,673,102 | 6/1987 | Bullock, Jr. | 264/46.5 |

Primary Examiner—Randolph A. Reese
Assistant Examiner—Spencer Warnick
Attorney, Agent, or Firm—Price, Heneveld, Cooper, DeWitt & Litton

[57] ABSTRACT

A high strength polymeric composite material dipper stick which comprises a structure including an outer casing member formed of high strength polymeric composite materials, an inner filler comprising polyurethane foam disposed inside the outer casing member in order to be integrated with the outer casing member, and a plurality of bushing holders made of polymeric composite material and disposed at connecting portions of the structure in order to be integrated with said structure. The present invention provides weight reduction of about 50%-60% in comparison with a conventional structural steel dipper stick, and also about 6.8%-13.9% in comparison with the conventional structural steel dipper stick on the basis of weight ratio of excavated earth.

10 Claims, 6 Drawing Sheets

Fig. 7
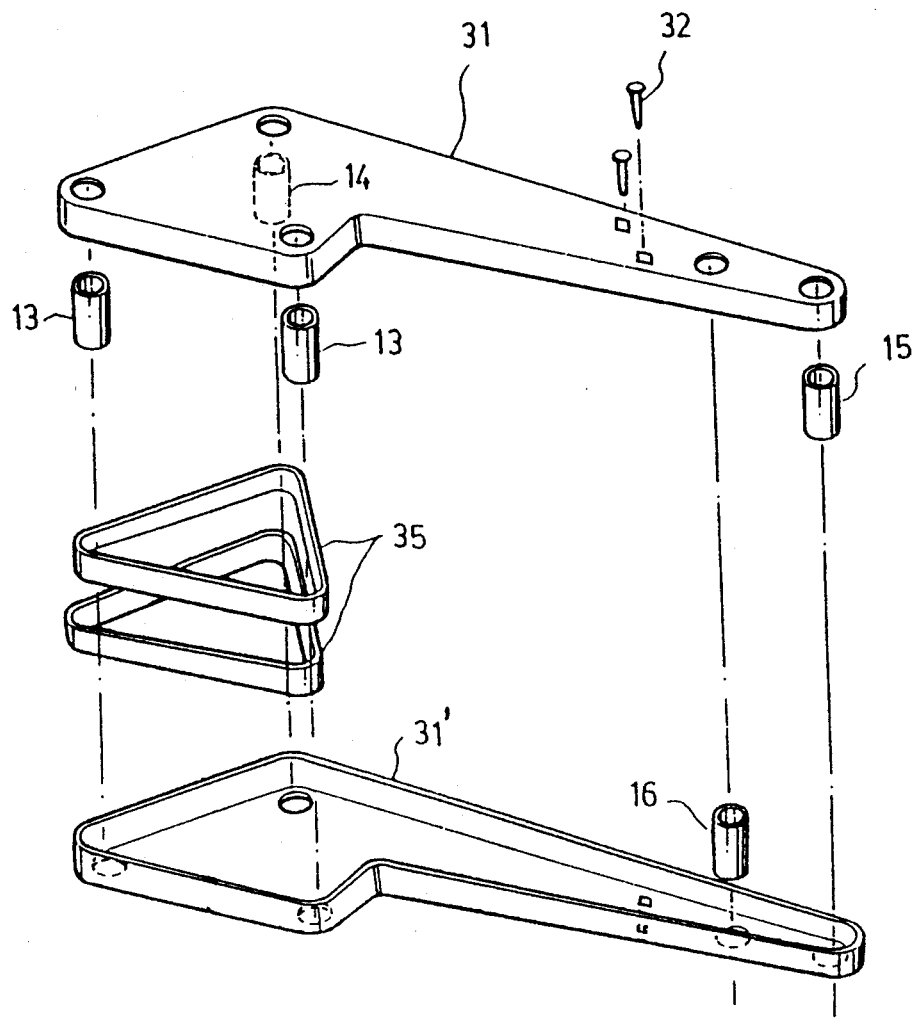
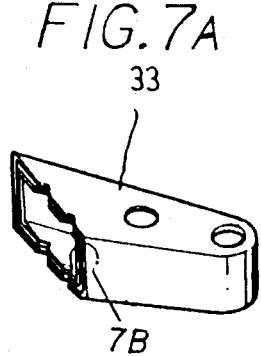
FIG. 7A
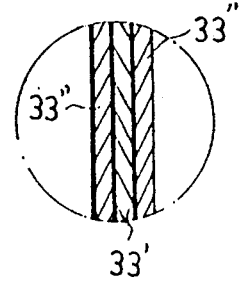
FIG. 7B

DIPPER STICK FOR EXCAVATOR OF HIGH STRENGTH POLYMERIC COMPOSITE MATERIALS AND METHOD FOR MANUFACTURING SUCH

BACKGROUND OF THE INVENTION

1. Field of The Invention

The present invention relates to a dipper stick, a part of an excavator, and more particularly to a dipper stick, made of polymeric composite materials such as fiber reinforced plastics, capable of improving excavation capacity as a result of reducing its own weight, and reducing manufacturing processes therefor in comparison with conventional structural steel dipper sticks simultaneously with having an optimal strength.

2. Description of the Prior Art

As shown in FIG. 1 which is a perspective view of a conventional excavator, the dipper stick 10 is hingewise connected at both ends thereof to a boom 2 and a excavating bucket 3, respectively, in order to be connected to and support them, the boom 2 adapted for supporting the excavating load. The dipper stick 10 is also connected to hydraulic cylinder actuators, a dipper cylinder 4 and a bucket cylinder 5, which cylinders 4 and 5 are telescopically actuated by a hydraulic controller (not shown) generally provided at the car body 1, thereby providing the excavating power for the excavating bucket 3. Therefore, the dipper stick 10 is necessarily subjected to the repeated intensive up-and-down and turning movements in accordance with the repeated telescopic motion of the hydraulic cylinders 4 and 5. As a result, the dipper stick 10 is known as an intensive movement part together with the excavating bucket 3 so that the dipper stick 10 has to be manufactured of materials capable of providing strength enough to withstand abrasion and mechanical shock encountered in the repeated excavating operation, as well as support the excavation load.

Generally, known dipper sticks have been, therefore, manufactured of structural steels, for example SS41, to correspond to the above-mentioned mechanical conditions. However, the structural steel dipper stick has disadvantages in that it has a considerably heavy weight caused by the relatively larger specific gravity of the structural steels, 7.9 g/cm$^3$. They also have a hollow, box-shaped and welded structure resulting in making the dipper stick be relatively weak as to outside mechanical shock, and also have low resistance against wear from repeated excavating operation and low resistance against corrosion as from the atmosphere and moisture. Furthermore, the steel dipper stick of the prior art has the most serious disadvantage in that it needs relatively larger sizes of car body, relatively larger hydraulic power and larger necessary engine capacity for providing the desired practical excavation capacity of the excavator, caused by the above-mentioned heavy weight thereof.

SUMMARY OF THE INVENTION

The inventors of this invention have studied for a few years in order to develop a dipper stick capable of reducing the weight thereof simultaneously with having a strength adequate to support the necessary excavation load, thereby solving the above-mentioned disadvantages encountered in the structural steel dipper stick of the prior art. As a result, the inventors have invented a dipper stick for an excavator made of high strength polymeric composite materials (hereinafter, referred to simply as "composite materials").

It is, therefore, an object of the present invention to provide a dipper stick for an excavator made of composite materials capable of reducing the weight thereof simultaneously with having the strength enough to support the excavation load, thereby reducing the respective sizes of the car body and the necessary engine capacity in comparison with the desired excavation capacity, thereby increasing the practical excavation capacity of the excavator.

It is another object of the present invention to provide a method for manufacturing the dipper stick made of the composite materials.

In one aspect, the present invention provides an excavator comprising a car body, a boom, an excavating bucket, dipper and bucket cylinders each for transmitting the excavation power from a hydraulic controller of said car body to said excavating bucket, a link, and a dipper stick connected to said boom and said bucket at both ends thereof, said dipper stick comprising: a box-shaped structure including an outer casing member formed of high strength polymeric composite materials and an inner filler comprising polyurethane foam and disposed inside said outer casing member in order to be integrated with said outer casing member; and a plurality of bushing holders made of polymeric composite material and disposed at connecting portions of said box-shaped structure in order to be integrated with said structure, the dipper stick connected at the connecting portions to the bucket, boom, dipper and bucket cylinders and the link, respectively.

In another aspect, the present invention provides a manufacturing method for a dipper stick comprising providing a box-shaped structure including an outer casing member formed of high strength polymeric composite materials, causing an inner filler comprising polyurethane foam to be disposed inside the outer casing member and embedding a plurality of bushing holders made of polymeric composite material at respective connecting portions of the box-shaped structure in order to be integrated with the box-shaped structure, connecting the dipper stick at the respective connecting portions to a bucket, a boom, dipper and bucket cylinders and a link, respectively, the manufacturing method comprising the steps of: forming each bushing holder by a filament winding process and forming the inner filler comprising said polyurethane foam; assembling each bushing holder with the inner filler in order to provide a first assembly; arranging the first assembly in a cavity of a mold of a resin transfer molding system, and then forming the box-shaped structure by a resin transfer molding process in which liquid polymeric material is transferred to the mold and a curing treatment is carried out.

BRIEF DESCRIPTION OF THE DRAWINGS

The above and other objects, features and other advantages of the present invention will be more clearly understood from the following detailed description taken in conjunction with the accompanying drawings, in which:

FIG. 7 is an exploded perspective view corresponding to FIG. 3, but showing another embodiment of a dipper stick made of composite materials in accordance with the present invention;

FIG. 7A is a fragmentary, enlarged, perspective view of the right end of the assembled components depicted in FIG. 7; and FIG. 7B is a fragmentary, enlarged sectional view of the wall portion designated 7B in FIG. 7A.

DETAILED DESCRIPTION OF THE PREFERRED EMBODIMENTS

Figure 1:
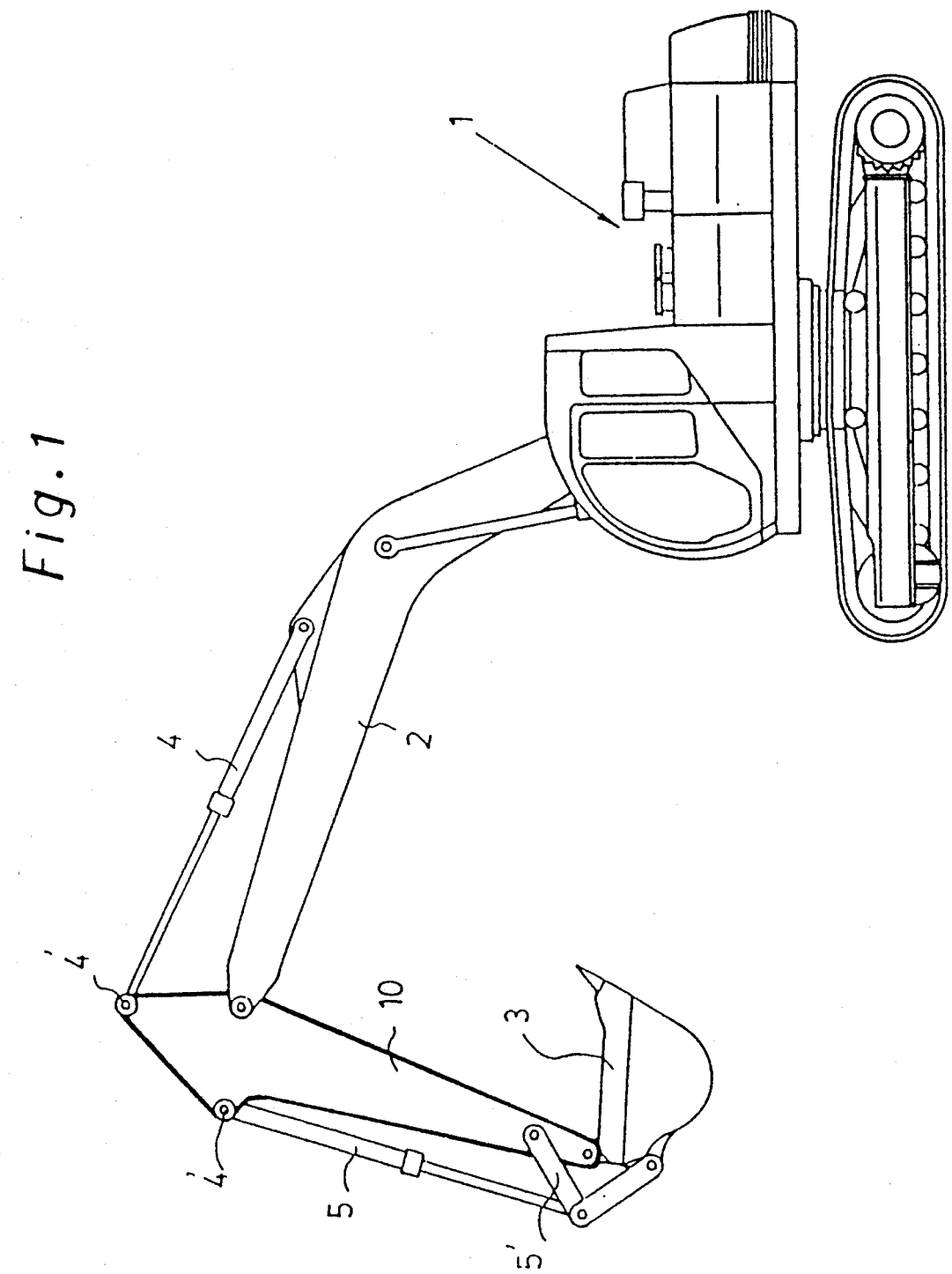
FIG. 1 is a side elevational view of an excavator equipped with a dipper stick.
Figure 2:
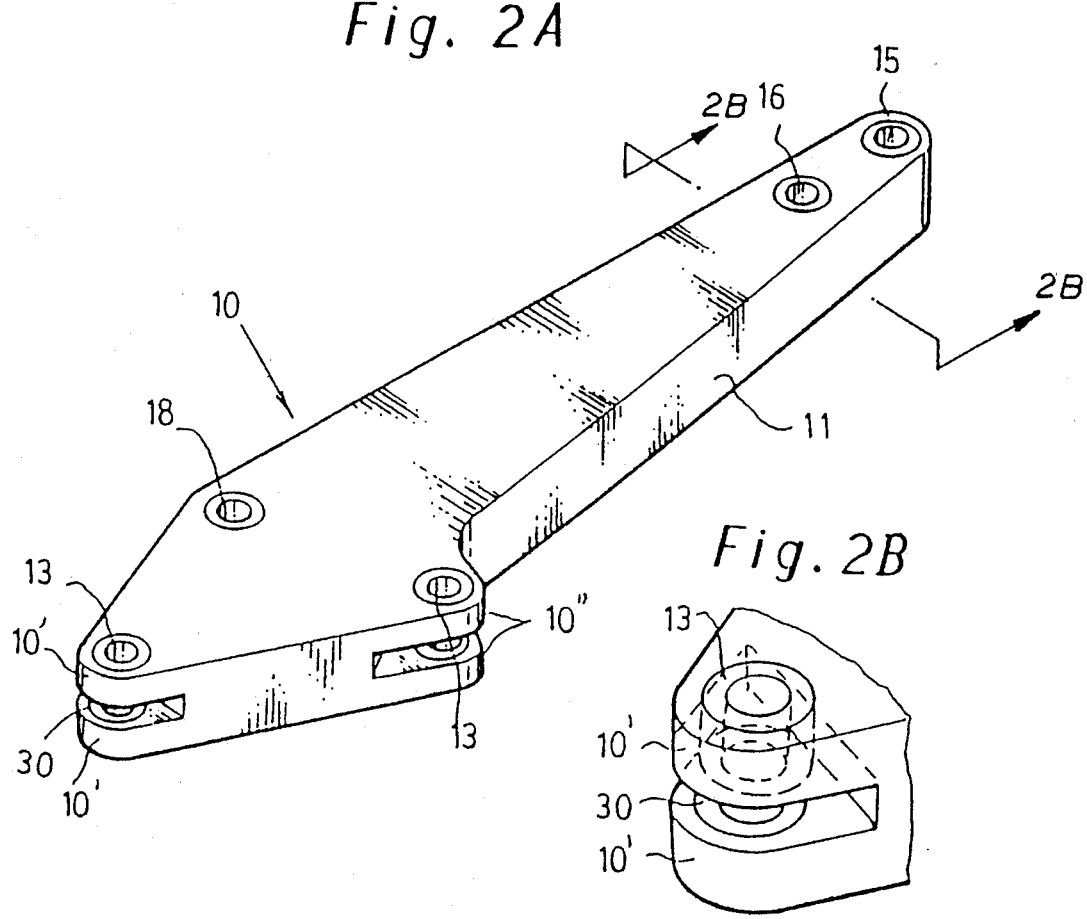
FIGS. 2A and 2B are, respectively, a perspective view of an embodiment of a dipper stick for the excavator made of composite materials in accordance with the present invention, and an enlarged fragmentary perspective view of the dipper stick of FIG. 2A, respectively.
Figure 3:
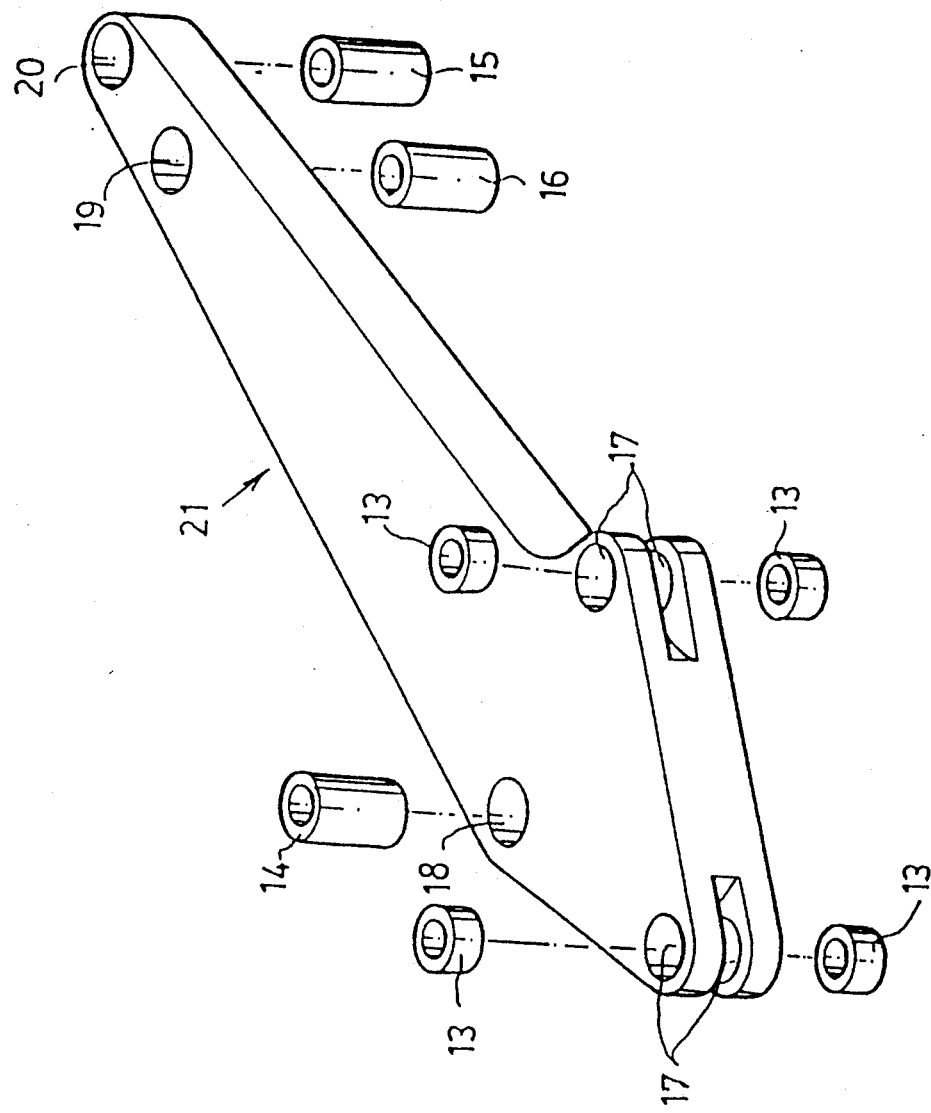
FIG. 3 is an exploded perspective view of the dipper stick of FIGS. 2 before being subjected to a resin transfer molding process.
Figure 4A:
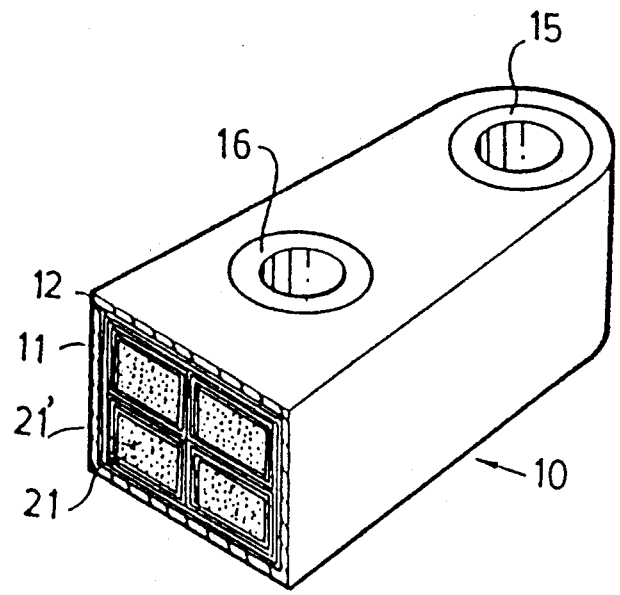
FIGS. 4A and 4B are sectional perspective views taken along the plane A—A of FIG. 2A, and showing respective embodiments of an inner filler comprising four blocks of polyurethane foam and fiber reinforcement.
Figure 4B:
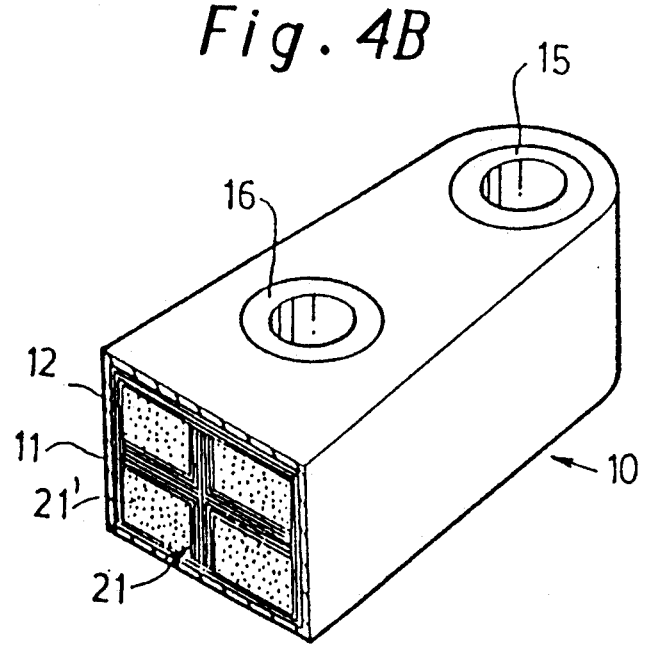

Referring now to the FIGS., FIG. 2A is a perspective view of an embodiment of a dipper stick for the excavator made of composite materials in accordance with the present invention, and FIG. 2B is an enlarged perspective view of a lug flange of the dipper stick of FIG. 2A. FIG. 3 is an exploded perspective view of the dipper stick of FIGS. 2 before being subjected to a resin transfer molding process (referred to simply as "RTM process"). FIGS. 4A and 4B each is a sectional perspective view taken along the line A—A of FIG. 2A, and showing respective embodiments of an inner filler comprising polyurethane foam and fiber reinforcement. The dipper stick 10 has the conventional box-shaped structure, but includes an outer casing member 11 made of the composite material. The dipper stick 10 comprises the outer casing member 11 (hereinafter, referred to simply as "casing member") and the inner filler 21 disposed in the casing member 11 as shown in FIGS. 2 and 3. The casing member 11 is formed as by covering the inner filler 21 by means of the RTM method by using the composite materials such as a fiber reinforced plastic (hereinafter, referred to simply as "FRP"). The inner filler 21 is adapted for supporting the shape of the casing member 11 and absorbing a mechanical shock which may be dealt to the casing member 11. In addition, the inner filler 21 comprises the polyurethane foam 21' and fiber reinforcement 12 deposited polyurethane foam 21', and is provided by an auxiliary process, which process will be described in more detail later. The casing member 11 is integrally formed with the previously provided inner filler 21 by means of the composite materials during the RTM process.

The dipper stick 10 is provided with two pairs of U-shaped lug flanges 10' and 10", forming respective slots 22 at respective connecting portions thereof with the dipper cylinder 4 and the bucket cylinder 5. An end of each cylinder 4, 5 is received by each corresponding slot 22. Each lug flange 10', 10" is provided with a pair of pipe-shaped bushing holders 13. Each holder comprises a filament layer of composite materials and is adapted for receiving a hinge pin 4'. The hinge pins 4' are adapted to connect the dipper stick 10 to hydraulic cylinders 4 and 5, respectively. In addition, the dipper stick 10 is provided with a plurality of bushing holders 14, 15 and 16 (FIG. 3) at connecting portions thereof with the boom 2, the bucket 3 and a link 5', respectively. Each bushing holder 14, 15, 16 comprises a structural steel pipe with composite material filament tightly densely wound on the structural steel pipe in order to have about 10 mm thickness. All the bushing holders 13, 14, 15 and 16 are previously formed by the filament winding process, which process will be described in more detail later, and then disposed at respective positions of the inner filler 21, in turn subjected to the RTM process, thereby being integrated with the casing member 11.

The inner filler 21 comprises polyurethane foam 21' and fiber reinforcement 12 wound on the polyurethane foam 12 as shown in FIGS. 4A and 4B so that the inner filler 21 has a cross-shaped or check-shaped section, thereby improving the strength and the shock resistance of the inner filler 21. The fiber reinforcement 12 comprises a glass fiber, an aramide fiber and/or a carbon fiber. This inner filler 21 will be described in detail later.

The first embodiment of the dipper stick above described is manufactured by the following process.

Figure 5:
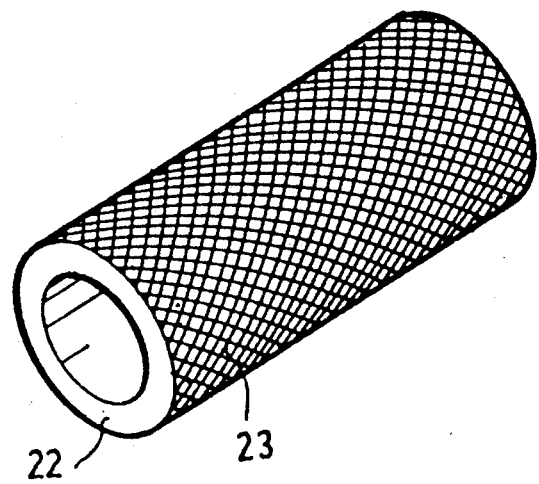
FIG. 5 is a schematic perspective view showing the 45° filament winding state, an example of a filament winding method, for forming each bushing holder of FIG. 3.

In manufacturing, the bushing holders 13, 14, 15 and 16 together with the inner filler 21 are first formed. Shown in FIG. 5 is a schematic perspective view showing the 45° filament winding method, one example of the filament winding method. Each of bushing holders 13, 14, 15, 16 is formed by the filament winding method in which a continuous fiber 23 impregnated with resin is densely tightly wound on a structural steel pipe mandrel 22 (FIG. 5) and then subjected to a room temperature curing treatment. Each bushing holder 13, 14, 15, 16 may comprise the structural steel pipe mandrel 22 and the impregnated fiber 23 wound on the mandrel 22 and room temperature cured, or only the impregnated fiber 23 provided by removing the mandrel 22 after accomplishing the room temperature curing treatment, as required. In addition, the bushing holders 13, 14, 15 and 16 may be formed at any angle of filament winding including 90° filament winding, as required, this 90° winding being known as the Hoop winding method. In the 90° Hoop filament winding method, the impregnated continuous fiber 23 is wound on the mandrel 22 at a 90° angle to the lengthwise axis of the mandrel 22. The filament winding method for manufacturing each bushing holder 13, 14, 15, 16 will be described in detail in the following Example 1. In accordance with this Example 1, each bushing holder comprises the structural steel pipe mandrel 22 and the impregnated continuous fiber 23 wound on the mandrel 22 in accordance with the 90° filament winding method. However, the filament winding method may adopt a spiral winding method with any winding angle, as above mentioned.

EXAMPLE 1

A mandrel is provided as a structural steel pipe bushing holder having a 4 mm thickness, which 4 mm thickness is ¼ of the general thickness of the conventional bushing holder, thereby reducing its own weight. On the mandrel, Z 303 LBO continuous filament (tensile strength: 400 Kgf/mm, elastic modulus: 50 msi), commercially obtained from Nippon Carbion Co. of Japan, impregnated with room temperature curing type unsaturated polyester resin or room temperature curing type vinyl ester resin is tightly densely wound by means of a filament winding machine manufactured by Korea Institute of Machinery and Metals' Laboratory. Thereafter, the mandrel wound with the impregnated filament is subjected to the room temperature curing treatment. At this time, the winding condition comprises the 10 Kgf tensile force and the 90 Hoop filament winding method, and the room temperature curing treatment is carried out for 3 hours at 25° C. temperature.

In accordance with the Example 1, a bushing holder having a strength enough to support the tensile force urged thereto is obtained.

On the other hand, each of the bushing holders 13 and 13, provided to the first embodiment of dipper stick 10 at the U-shaped lug flanges 10' and 10", is formed as being relatively shorter than the other bushing holders 14, 15 and 16.

In manufacturing the inner filler 21, the polyurethane foam element 21' is first formed by expansion of polyurethane prepreg having been poured into an expansion mold. The mold is made of a FRP and includes a cavity having volumes ranging between about 70%-about 80% of the whole volume of the dipper stick 10. Thereafter, the polyurethane foam element 21' is divided lengthwise into four equal parts, each part of which is then wound with the fiber reinforcement 12 comprising the glass fiber, the aramide fiber and/or the carbon fiber. At this time, the fiber reinforcement 12 may be totally wound on each equally divided polyurethane foam part in order to reinforce all four lengthwise surfaces thereof as shown in FIG. 4A. The fiber reinforcement 12 may be also partially deposited between the two inner surfaces of each divided polyurethane foam part as shown in FIG. 4B. Thereafter, all of the divided polyurethane foam parts 21' provided with the fiber reinforcement 12 are combined again, and then all together wound with the fiber reinforcement 12 comprising glass fiber, aramide fiber and/or carbon fiber so that the inner filler 21 has the cross-shaped or check-shaped section. The inner filler 21 is then subjected to a drilling process for providing a plurality of mounting holes 17, 18, 19 and 20 (FIG. 3), each for receiving respective bushing holders 13, 14, 15, 16, and two slots 30 each for providing U-shaped lug flanges 10', 10". However, the mounting holes 17, 18, 19 and 20 and the slots 30 may be formed simultaneously with foaming the polyurethane foam 21' by means of expansion mold provided with auxiliary molds adapted for forming holes 17, 18, 19 and 20 and slots 30. The result is inner filler 21 having the outer shape shown in FIG. 3 and the sectional structure shown in FIG. 4A or 4B.

Thereafter, each bushing holder 13, 14, 15, 16 is disposed in each corresponding mounting hole 17, 18, 19, 20 of the inner filler 21 in order to provide a first assembly.

The first assembly comprising the bushing holders and the inner filler is then subjected to the RTM process (see FIG. 6) in order to accomplish the dipper stick 10 of the composite materials. An example of the RTM process will be described in the following Example 2.

EXAMPLE 2

Figure 6:
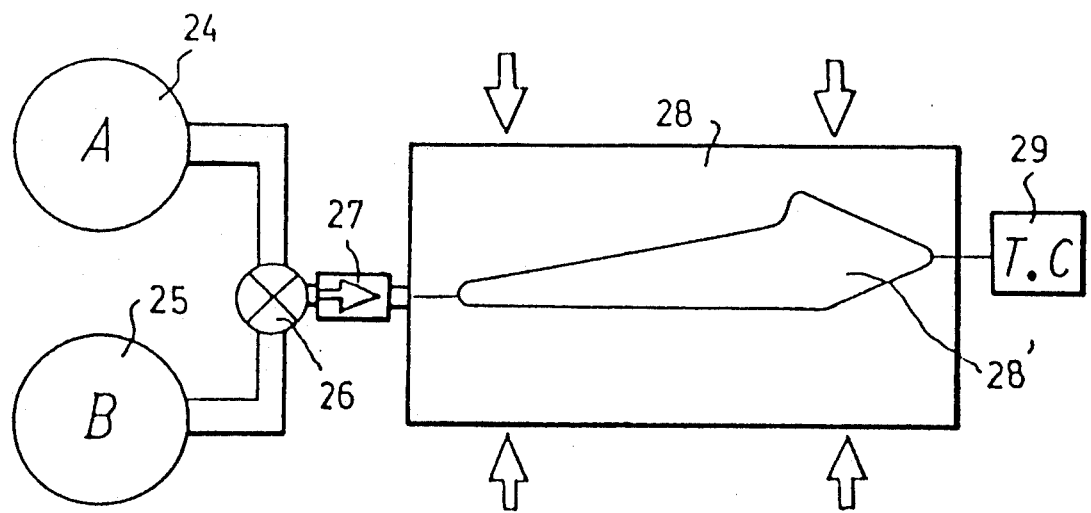
FIG. 6 is a schematic view showing a resin transfer molding system, a system for carrying out the last step of the process for manufacturing the dipper stick in accordance with the present invention.

As shown in FIG. 6, the RTM system generally comprises a pair of resin reservoirs 24 and 25 for storing A resin and B resin, respectively, resin transfer controllers 26 and 27 sequentially communicated with said resin reservoirs 24 and 25 and adapted for controlling the resin transfer, a mold 28 communicated with the resin transfer controller 27 and comprising an upper mold and a lower mold, and a temperature controller 29 adapted for controlling the forming temperature for said mold 28. The mold 28 is provided with a cavity 28' between the upper mold and the lower mold thereof, which cavity 28' has the shape and the size each corresponding to the dipper stick 10. In the RTM process, the first assembly comprising the inner filler 21 provided with the bushing holders 13, 14, 15 and 16 is first arranged in the cavity 28' of the mold 28. Thereafter, the composite materials, that is to say the liquid polymeric resin such as the above-mentioned vinyl ester resin or the unsaturated polyester resin, mixed with the conventional additives such as a catalyst, an accelerator, a promoter, a gelling retarder and the like, is transferred from the respective resin reservoirs 24 and 25 to the mold 28 by way of the resin transfer controllers 26 and 27 for about 5-10 minutes under the vacuum state inside the mold 28. At this time, the resin transfer pressure is set below about 5 bar. Thereafter, the mold 28 is subjected to a thermal curing treatment for about 30-40 minutes under the vacuum state. As a result, the composite material dipper stick 10 according to this invention is provided. During the above RTM process, simultaneously with dense filling the minute spaces, each provided between each bushing holder 13, 14, 15, 16 and each corresponding mounting hole 17, 18, 19, 20 of the inner filler 21, the composite materials transferred into the mold 28 forms the casing member 11 on the whole outer surface of the inner filler 21, said casing member 11 having a predetermined thickness and integrated with said inner filler 21. Preferably, the respective composite materials forming the parts of the dipper stick 10 each formed during the RTM process, comprise the DERAKANE 411-45 vinyl ester resin commercially obtained from the Dow Chemical Co. of U.S.A. and the UNIFILO ® U 814 or U 750 glass fiber mat commercially obtained from the Vetrotex Co. of U.S.A.. The DERAKANE 411-45 vinyl ester resin has desirable viscosities ranging from about 400 mPa.s to about 500 mPa.s, more preferably 450 mPa.s. The resin transfer pressure may be desirably less than about 5 bar or adopt the vacuum state inside the mold 28. It is very desirable to provide the vacuum state for the mold 28 during the resin transferring because the vacuum state inside the mold 28 facilitates the impregnation of the composite materials into the fiber reinforcement 12 wound on the polyurethane foam element 21' of the inner filler 21 disposed in the cavity 28', simultaneously with facilitating the resin transfer from the reservoirs 24 and 25 to the mold 28. In this RTM process, the additives are used as follows: methylethylketone peroxide (MEKP) such as the Butanox LPT commercially obtained from the Akzo Co. of the Netherlands as the catalyst; diethylaniline, dimethylaniline or dimethylacetoacetamide as the accelerator; cobalt Naphthenate as the promoter; and 2.4-pentanedion as the gelling retarder.

In accordance with the Example 2, the composite material dipper stick 10 has good strength and relatively light weight together with fine appearance.

Turning next to FIG. 7 which is an exploded perspective view showing a second embodiment of a dipper stick 10 of composite materials in accordance with the present invention, this composite material dipper stick 10 comprises upper and lower panels 31 and 31', the inner filler 21 of FIGS. 4A and 4B disposed inside upper and lower panels 31 and 31', and a flange (not shown in FIG. 7) wound on said upper and lower panels 31 and 31' in accordance with a tape winding method. The upper and lower panels 31 and 31', each previously formed by a vacuum bag molding method, cover the inner filler 21. The panels 31 and 31' are then wound with a prepreg tape in order to provide the flange, said flange adapted to efficiently support the excavation load, and thereafter, subjected to the RTM process described in the first embodiment, thereby providing the casing member 11 of composite materials. In this second embodiment, the dipper stick 10 has the box-shaped appearance without any lug flange 10', 10'', different in this respect from the first embodiment.

This second embodiment of the dipper stick 10 also includes a pair of triangular reinforcing rings 35 (FIG. 7) each disposed to surround the three bushing holders 13 and 14 arranged at the respective mounting holes 17 and 18 of the connection portions of the dipper stick 10 where the dipper stick 10 is connected to the boom 2. Each bushing holder 13, 14 is formed by the same filament winding method as that of the first embodiment, but having the same length as each other because of having no lug flange 10', 10'' in contrast to the first embodiment. Each triangular reinforcing ring 35 is previously formed by the filament winding method and adapted for reinforcing the bushing holders 13 and 14, thereby making the bushing holders 13 and 14 capable of withstanding the tensile stress encountered in the excavating operation.

In this second embodiment, the filament winding method for providing the bushing holders 13, 14, 15 and 16 and the triangular reinforcing ring 35, together with the foaming method for providing the inner filler 21, are the same as those of the first embodiment. Therefore, the detailed descriptions for these methods can be comparable to those of the first embodiment. On the other hand, the vacuum bag molding method for providing the upper and lower panels 31 and 31' and the tape winding method for providing the flange will be more described in more detail in the following Example 3, an example for representing a manufacturing process for the second embodiment of the dipper stick 10.

EXAMPLE 3

Each of the upper and lower panels 31 and 31' is initially formed by depositing a prepreg tape in correspondence with the designed shape of each panel 31, 31', said prepreg tape comprising the NEG glass fiber commercially obtained from the Nippon Electric Glass Co. of Japan and the Epoxy resin commercially obtained from the Gook Do Chemical Co. of the Republic of Korea. Thereafter, each initially formed panel 31, 31' is covered and tightly sealed with a film bag, said film bag comprising the Nylon 66 film commercially obtained from the Airtech Co., and then subjected to a vacuum state of about 680 mmHg provided by a vacuum pump. Each panel covered with the film bag under the vacuum state is then subjected to a curing treatment in a curing oven in accordance with a predetermined curing cycle. As a result, the upper and lower panels 31 and 31' corresponding to the desired mechanical and chemical conditions are obtained. On the other hand, the bushing holders 13, 14, 15 and 16 and the triangular reinforcing ring 35, each previously provided by the filament winding method, are arranged at respective positions of the previously provided inner filler 21 comprising the polyurethane foam, and then each is applied with the 2447 Packing Epoxy commercially obtained from the IPCO Co. in order to be fixedly stuck to said inner filler 21. Thereafter, the inner filler 21 provided with the bushing holders 13, 14, 15 and 16 and the triangular reinforcing rings 35 are then encased with the upper and lower panels 31 and 31'. At this time, the upper and lower panels 31 and 31' have applied thereto the 2447 Packing Epoxy in order to be stuck fixedly to each other and also to the inner filler 21. The panels 31 and 31' enclosing the inner filler 21 are then wound 36 times with a prepreg tape having the width of about 60 mm and comprising glass fiber/epoxy resin, and then subjected to a curing process in a curing oven in order to provide a first assembly. Thereafter, the first assembly is arranged in the cavity 28' of the mold 28 of the RTM system shown in FIG. 6 and then subjected to the same RTM process as that of the first embodiment, thereby providing the casing member 11 on the first assembly. At this time, the conditions of the RTM process are the same as those of the first embodiment.

The composite material dipper stick 10 obtained in accordance with Example 3 has similar properties to those of the dipper stick 10 of the first embodiment.

In addition, the dipper stick 10 in accordance with the present invention may be provided with an anti-shock/antiabrasion member 33 (FIG. 7) inserted in the dipper stick in a manner that each hole of the antishock-/antivibration member 33 is aligned with holes 19 and 20 (FIG. 3). Member 33 is thus at the connecting portion thereof, i.e., at said connecting portion of said dipper stick 10 to the bucket 3, so as to increase the shock resistance and the abrasion resistance of the dipper stick 10 during the repeated excavating operation. The antishock/antiabrasion member 33 comprises, as shown in FIG. 7, a porous rubber layer 33' and a pair of polyethylene deposition layers 33'' disposed on both sides of said rubber layer 33', respectively, and fixedly mounted to the dipper stick 10 by means of a plurality of locking bolts 32.

As represented in the following table 1, the above-mentioned composite material dipper stick 10 in accordance with this invention has a strength increased about three times over that of the conventional dipper stick of structural steel such as SS41. Furthermore, this composite material dipper stick 10 is reduced in weight in comparison with the conventional dipper stick of structural steel, by about 50% in case of a small capacity excavator, and by about 60% in case of a large capacity excavator. If these weight reductions of this composite material dipper stick 10 in comparison with the conventional dipper stick of structural steel are converted into the weight ratio of excavated earth which in turn means the practical improvement of the excavation capacity of the excavator, this composite material dipper stick 10 is reduced in weight from that of the conventional dipper stick by about 6.8% of the excavated earth in case of a small capacity excavator, and about 13.9% of the excavated earth in case of a large capacity excavator. As a result, the dipper stick according to this invention provides the same excavating capacity as that of the conventional dipper stick of structural steel, while enabling the excavator to be equipped with relatively smaller car body and necessary engine capacity in proportion to the weight reduction ratios on the basis of the excavated earth. In other words, the composite material dipper stick 10 according to this invention provides an improvement in the excavation capacity of about 6.8-13.9% for excavators in comparison with other excavators equipped with a conventional structural steel dipper stick, the same size car body and the same capacity engine.

TABLE 1

A comparison table for representing the weight reductions of the composite material dipper stick (CM D/S) in comparison with a conventional structural steel dipper stick (SS41 D/S).

| classi-fication | | size | SS41 D/S weight, Wm | CM D/S weight, Wc | weight reduction, Ws |
|---|---|---|---|---|---|
| small capacity | B/C: W/E. | 0.22 m³ W: 770 Kg | 102 Kg Wm/W≈0.132 | 50 Kg Wc/Wm≈0.5 | 52 Kg Ws/W≈0.068 |
| large capacity | B/C: W/E, | 0.80 m³ W: 2800 Kg | 650 Kg Wm/W≈0.232 | 260 Kg Wc/Wm≈0.4 | 390 Kg Ws/W≈0.139 |

In the table, B/C and W/E denotes the bucket capacity and the weight of an excavated earth, respectively.

As described above, the composite material dipper stick in accordance with this invention provides weight reduction of about 50%-60% in comparison with the conventional structural steel dipper stick, and also about 6.8%-13.9% in comparison with a conventional structural steel dipper stick on the basis of the weight ratio of the excavated earth. As a result, this composite material dipper stick provides an advantage improvement of about 6.8%-13.9% in the excavation capacity. Furthermore, this composite material dipper stick provides other advantages or improvements of corrosion resistance, shock resistance and vibration resistance as a result of properties of the composite materials such as FRP, the main materials of the dipper stick according to this invention, such as relatively good corrosion resistance, good abrasion resistance and good elasticity. Therefore, the present invention provides another advantage of providing an excavator capable and desirable of use at a relatively poor working place such as harbor dredging work.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. In an excavator comprising a car body, a boom, an excavating bucket, dipper and bucket cylinders for transmitting excavation power from a hydraulic controller of said car body to said excavating bucket, a link, and a dipper stick connected to said boom and said bucket at both ends thereof, said dipper stick comprising:

an outer casing member formed of a high strength polymeric composite material;

an inner filler comprising polyurethane foam disposed inside said outer casing member and integrated with said outer casing member; and a plurality of bushing holders comprising polymeric composite material an disposed at connecting portions of said dipper stick and integrated with said outer casing member said dipper stick connected at said connecting portions to said bucket, said boom, said dipper and bucket cylinders and said link, respectively.

2. The dipper stick in claim 1, wherein said polyurethane foam of the inner filler is wound with fiber reinforcements.

3. The dipper stick in claim 1, wherein each said bushing holder comprises a metal pipe mandrel, and said composite material is wound as a continuous filament on said metal pipe mandrel and then subjected to a curing treatment.

4. The dipper stick in claim 1, wherein each said bushing holder consists of a continuous filament of said polymeric composite material.

5. The dipper stick in claim 1, wherein said dipper stick further comprises:

a pair of triangular reinforcing rings surrounding three of said bushing holders inside said inner filler, said three bushing holders disposed at said connecting portions with said boom and said dipper and bucket cylinders;

upper and lower panels each formed of polymeric composite materials and disposed between said inner filler and said outer casing member; and a polymeric composite material tape flange wound on said upper and lower panels.

6. The dipper stick in claim 1, where in said dipper stick further comprises an antishock/antiabrasion member at said connection portions where said dipper stick is connected to said bucket, said antishock/antiabrasion member comprising a porous rubber layer and a pair of polyethylene deposition layers disposed on both sides of said porous rubber layer.

7. A dipper stick for an excavator, comprising:

an outer casing member of polymeric material;

an inner polymeric foam filler inside said outer casing member and integrated thereto; and a plurality of bushing holders extending through said foam filler and said outer casing member as portions of said dipper stick forming connecting portions to other components.

8. The dipper stick in claim 7 wherein said polymeric foam filler comprises a plurality of elongated polyurethane foam parts wound with fiber reinforcement and grouped together inside said outer casing member.

9. The dipper stick in claim 8 wherein said bushing holders comprise wound fiber impregnated with resin.

10. The dipper stick in claim 9 wherein said bushing holder fiber is wound on steel mandrels.

* * * * *

UNITED STATES PATENT AND TRADEMARK OFFICE
CERTIFICATE OF CORRECTION

PATENT NO. : 5,245,770
DATED : Sep. 21, 1993
INVENTOR(S) : Jae I. Ko et al

It is certified that error appears in the above-indentified patent and that said Letters Patent is hereby corrected as shown below:

Column 9, line 59
"an" should be --and--;

Column 10, line 20
Before "composite" insert --polymeric--;

Column 10, line 40
"connection" should be --connecting--;

Signed and Sealed this

Second Day of August, 1994

Attest:

BRUCE LEHMAN

Attesting Officer          Commissioner of Patents and Trademarks